US012654943B2

(12) United States Patent     (10) Patent No.:   US 12,654,943 B2

Lan et al.     (45) Date of Patent:    Jun. 16, 2026

(54) ITEM SORTING SYSTEM AND METHOD

(71) Applicant: BEIJING GEEKPLUS TECHNOLOGY CO., LTD., Beijing (CN)

(72) Inventors: Qiufeng Lan, Beijing (CN); Qian Zhang, Beijing (CN); Dong Liang, Beijing (CN); Feng Peng, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 519 days.

(21) Appl. No.: 18/248,912

(22) PCT Filed: Oct. 11, 2021

(86) PCT No.: PCT/CN2021/123074

§ 371 (c)(1),
(2) Date: Apr. 13, 2023

(87) PCT Pub. No.: WO2022/078290

PCT Pub. Date: Apr. 21, 2022

(65) Prior Publication Data

US 2023/0382645 A1     Nov. 30, 2023

(30) Foreign Application Priority Data

Oct. 15, 2020   (CN) .......................... 202011103665.7

(51) Int. Cl.
| | |
|---|---|
| *B65G 1/137* | (2006.01) |
| *B65G 1/06* | (2006.01) |
| *G06Q 10/08* | (2023.01) |

(52) U.S. Cl.
CPC ........... B65G 1/1378 (2013.01); B65G 1/065 (2013.01); G06Q 10/08 (2013.01)

(58) Field of Classification Search
CPC ...... B65G 1/065; B65G 1/1378; G06Q 10/08; B07C 3/02; B07C 5/36; B07C 2501/0063
See application file for complete search history.

(56) References Cited

U.S. PATENT DOCUMENTS

| | | | |
|---|---|---|---|
| 10,315,231 B1* | 6/2019 | Brazeau | .................... B07C 5/38 |
| 11,599,849 B2* | 3/2023 | Li | ........................... G07F 17/12 |

(Continued)

FOREIGN PATENT DOCUMENTS

| | | |
|---|---|---|
| CN | 104142682 | 11/2014 |
| CN | 206083143 | 4/2017 |

(Continued)

OTHER PUBLICATIONS

English Translation of CN 109351643; Inv: Liu; Pub. Date: Feb. 2019 (Year: 2019).*

(Continued)

*Primary Examiner* — Joseph C Rodriguez

(74) *Attorney, Agent, or Firm* — Hodgson Russ LLP

(57)      ABSTRACT

An item sorting system includes a control server, a first robot, and a second robot, which respectively communicate with the control server and run in a storage area of the item sorting system. The storage area is deployed with at least one item-collecting container, each including at least two sub-compartments. The control server determines a target sub-compartment of the item-collecting container, and sends a sorting instruction to the first robot. The control server sends a transport instruction to the second robot when the target sub-compartment is a first sub-compartment of a first item-collecting container and items accommodated in the first sub-compartment reach a first preset threshold. The first robot delivers an item to the first sub-compartment in response to the sorting instruction. The second robot travels to a position of the first item-collecting container and (Continued)

transports the first item-collecting container to a packaging station in response to the transport instruction.

18 Claims, 6 Drawing Sheets

(56)               References Cited

U.S. PATENT DOCUMENTS

| | | | |
|---|---|---|---|
| 2009/0230031 A1 | 9/2009 | Norris | |
| 2016/0176638 A1 | 6/2016 | Toebes | |
| 2021/0200227 A1* | 7/2021 | Liu | B07C 3/10 |
| 2021/0323800 A1* | 10/2021 | Liu | B65G 1/0485 |
| 2021/0395008 A1* | 12/2021 | Zheng | G05D 1/223 |
| 2022/0024691 A1* | 1/2022 | Serstad | B66F 9/063 |
| 2022/0106122 A1* | 4/2022 | Tie | B65G 1/0407 |
| 2025/0128882 A1* | 4/2025 | Lin | B65G 1/1371 |

FOREIGN PATENT DOCUMENTS

| | | |
|---|---|---|
| CN | 107398426 | 11/2017 |
| CN | 107918802 | 4/2018 |
| CN | 108672308 | 10/2018 |
| CN | 108806115 | 11/2018 |
| CN | 109324578 | 2/2019 |
| CN | 109351643 | 2/2019 |
| CN | 111415122 | 7/2020 |
| CN | 111470239 | 7/2020 |
| CN | 111604285 | 9/2020 |
| CN | 112239040 | 1/2021 |
| CN | 112371518 | 2/2021 |
| JP | 2016113291 | 6/2016 |
| JP | 2019533624 | 11/2019 |
| KR | 20190046212 | 5/2019 |
| KR | 20190105636 | 9/2019 |
| KR | 20200003137 | 1/2020 |
| WO | 2019218877 | 11/2019 |
| WO | 2019238030 | 12/2019 |

OTHER PUBLICATIONS

CNIPA, First Office Action for CN Application No. 202011103665. 7, Jan. 11, 2021.

WIPO, International Search Report and Written Opinion for PCT/CN2021/123074, Dec. 30, 2021.

KIPO, Request for Submission of an Opinion for KR App. No. 10-2023-7016426, Nov. 10, 2024.

KIPO, Notice of Allowance for KR Application No. 10-2023-7016426, Jul. 22, 2025.

* cited by examiner determining by a control server a target sub-compartment from at least two sub-compartments of at least one item-collecting container, and sending a sorting instruction to a first robot; and sending by the control server a transport instruction to a second robot when the target sub-compartment is a first sub-compartment of a first item-collecting container and items accommodated in the first sub-compartment reach a first preset threshold          S101 delivering by the first robot an item to the first sub-compartment in response to the sorting instruction          S102 in response to the transport instruction, travelling by the second robot to a position of the first item-collecting container, and transporting the first item-collecting container to a packaging station specified by the transport instruction          S103

FIG. 10

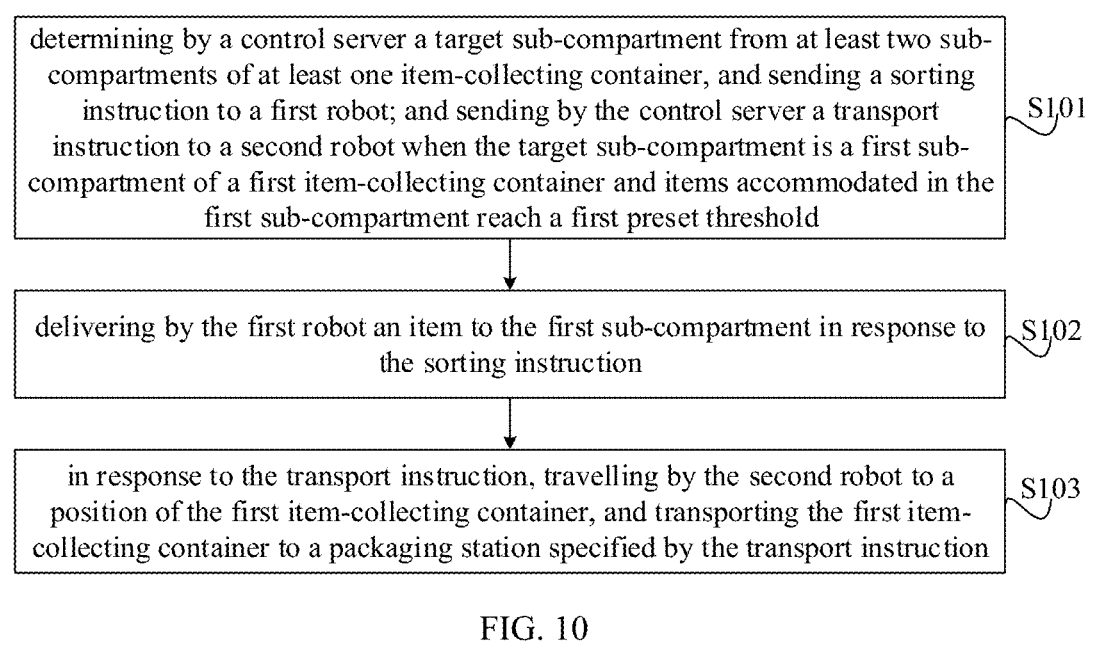

ITEM SORTING SYSTEM AND METHOD

CROSS-REFERENCE TO RELATED APPLICATIONS

This application is a U.S. national phase entry of International Application No. PCT/CN2021/123074, filed on Oct. 11, 2021, which claims priority to Chinese Patent Application No. 202011103665.7, filed on Oct. 15, 2020, the entire disclosures of which are incorporated herein by reference.

TECHNICAL FIELD

The present disclosure relates to a field of intelligent logistics technologies, and particularly to an item sorting system and method.

BACKGROUND

With the development of e-commerce, severe challenges are proposed for a logistics industry. For example, how to sort an item efficiently and accurately.

At present, there are two item sorting modes: in a first mode, as illustrated in FIG. 1 (*a*), a steel platform type sorting structure is adopted, through controlling a robot to receive an item provided by an item supply table on a steel platform, the item is delivered into a compartment located on the steel platform in combination with an auxiliary equipment arranged on the steel platform; and in a second mode, as illustrated in FIG. 1 (*b*), a floor sawtooth type sorting structure is adopted, through controlling a robot to receive an item provided by the item supply table on a floor sawtooth type sorting site with a compartment, the item is delivered to a corresponding compartment.

However, for the first mode, it takes a large amount of cost to build a steel platform, and the steel platform is not easy to expand, so that when a robot performs an item sorting task on the steel platform, the flexibility is poor and limited by a number of auxiliary equipments, resulting in a low item sorting efficiency; for the second mode, when a number of robots is large and a density of robots is high, a congestion is easily caused when the robot performs the item sorting task in a sawtooth area, resulting in a low item sorting efficiency.

SUMMARY

According to a first aspect of embodiments of the present disclosure, an item sorting system is provided. The system includes: a control server, a first robot and a second robot; in which the first robot and the second robot respectively communicate with the control server respectively run in a storage area of the item sorting system; and at least one item-collecting container is deployed in the storage area, each of the at least one item-collecting container including at least two sub-compartments; in which, the control server is configured to determine a target sub-compartment from the at least two sub-compartments of the at least one item-collecting container, and send a sorting instruction to the first robot; and send a transport instruction to the second robot when the target sub-compartment is a first sub-compartment of a first item-collecting container and items accommodated in the first sub-compartment reach a first preset threshold;

the first robot is configured to deliver an item to the first sub-compartment in response to the sorting instruction; and the second robot is configured to, in response to the transport instruction, travel to a position of the first item-collecting container, and transport the first item-collecting container to a packaging station specified by the transport instruction.

According to a second aspect of embodiments of the present disclosure, an item sorting method is provided. The method is applied in an item sorting system including a control server, a first robot and a second robot, in which the first robot and the second robot respectively communicate with the control server and respectively run in a storage area of the item sorting system; the storage area is deployed with at least one item-collecting container, and each of the at least one item-collecting container includes at least two sub-compartments. The method includes:

determining by the control server a target sub-compartment from the at least two sub-compartments of the at least one item-collecting container, and sending by the control server a sorting instruction to the first robot; and sending by the control server a transport instruction to the second robot when the target sub-compartment is a first sub-compartment of a first item-collecting container and items accommodated in the first sub-compartment reach a first preset threshold;

delivering by the first robot an item to the first sub-compartment in response to the sorting instruction; and travelling by the second robot to a position of the first item-collecting container and transporting by the second robot the first item-collecting container to a packaging station specified by the transport instruction in response to the transport instruction.

According to a third aspect, a non-transitory computer readable storage medium is provided. The storage medium is configured in a control server of an item sorting system, in which the item sorting system further includes a first robot and a second robot, the first robot and the second robot respectively communicate with the control server and respectively run in a storage area of the item sorting system; the storage area is deployed with at least one item-collecting container, and each of the at least one item-collecting container includes at least two sub-compartments.

When instructions in the storage medium are executed by a processor of the control server, the processor is configured to:

determine a target sub-compartment from the at least two sub-compartments of the at least one item-collecting container, and send a sorting instruction to the first robot; and send a transport instruction to the second robot when the target sub-compartment is a first sub-compartment of a first item-collecting container and items accommodated in the first sub-compartment reach a first preset threshold.

BRIEF DESCRIPTION OF THE DRAWINGS

FIG. 1 (*b*) is a diagram illustrating a floor sawtooth type sorting structure in the related art;

FIG. 10 is a flowchart illustrating an item sorting method provided in embodiments of the present disclosure.

DETAILED DESCRIPTION

The embodiments of the present disclosure are further described below with reference to the accompanying drawings and embodiments. It may be understood that specific embodiments described here are merely used for explaining embodiments of the present disclosure, rather than a limitation of embodiments of the present disclosure. In addition, it should be noted that, for ease of description, only some rather than all of structures related to embodiments of the present disclosure are shown in the accompanying drawings.

The item sorting system and the item sorting method provided in embodiments of the present disclosure are described in combination with the accompanying drawings.

Figure 1A:
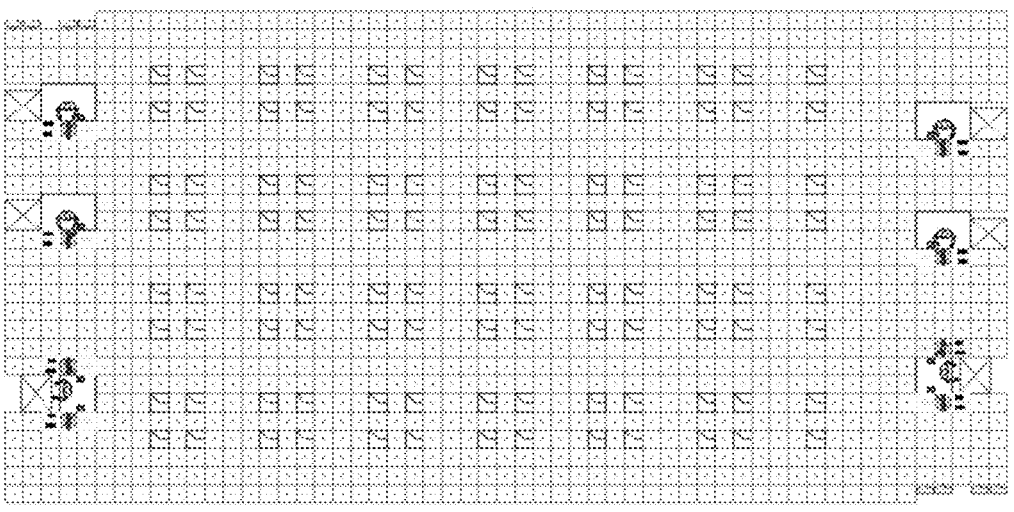
FIG. 1 (*a*) is a diagram illustrating a steel platform type sorting structure in the related art.
Figure 1B:
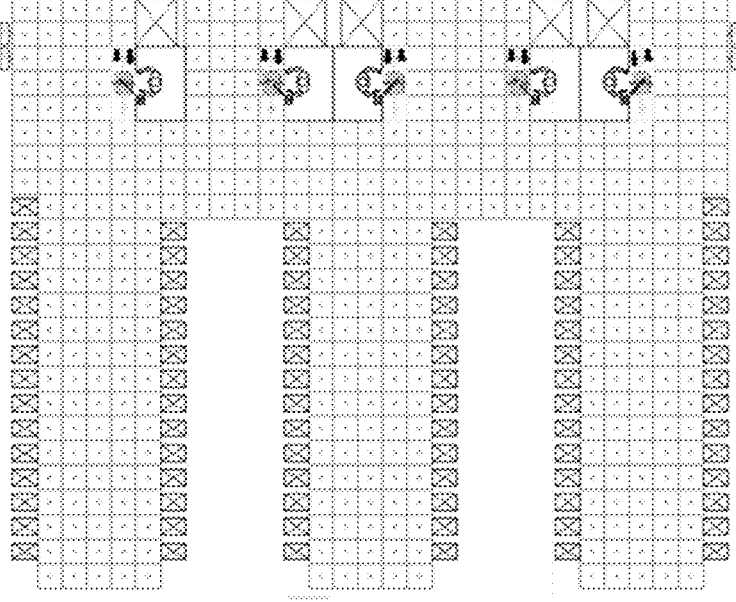
Figure 2:
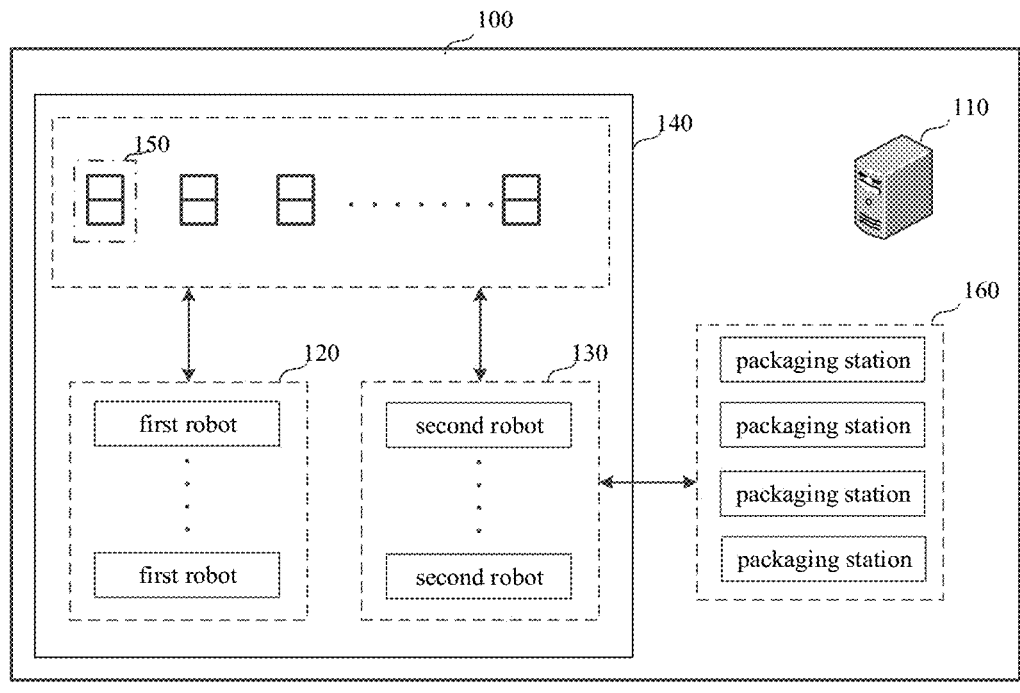
FIG. 2 is a diagram illustrating a structure of an item sorting system provided in embodiments of the present disclosure.

FIG. 2 is a diagram illustrating a structure of an item sorting system in embodiments of the present disclosure. The embodiments of the present disclosure are applicable to a scenario of item sorting. As illustrated in FIG. 2, an item sorting system 100 provided in embodiments of the present disclosure may include a control server 110, a first robot 120 and a second robot 130. In embodiments of the present disclosure, the first robot 120 and the second robot 130 respectively communicate with the control server 110, and run in a storage area 140 of the item sorting system 100; and at least one item-collecting container 150 is deployed in the storage area 140, each of the at least one item-collecting container 150 including at least two sub-compartments. The following is illustrated by taking each item-collecting container 150 including two sub-compartments as an example.

The control server 110 is configured to determine a target sub-compartment from the at least two sub-compartments of the at least one item-collecting container 150, and send a sorting instruction to the first robot 120; and send a transport instruction to the second robot 130 when the target sub-compartment is a first sub-compartment of a first item-collecting container and items accommodated in the first sub-compartment reach a first preset threshold;

the first robot 120 is configured to deliver an item to the first sub-compartment in response to the sorting instruction; and the second robot 130 is configured to, in response to the transport instruction, travel to a position of the first item-collecting container, and transport the first item-collecting container to a packaging station 160 specified by the transport instruction.

Figure 3:
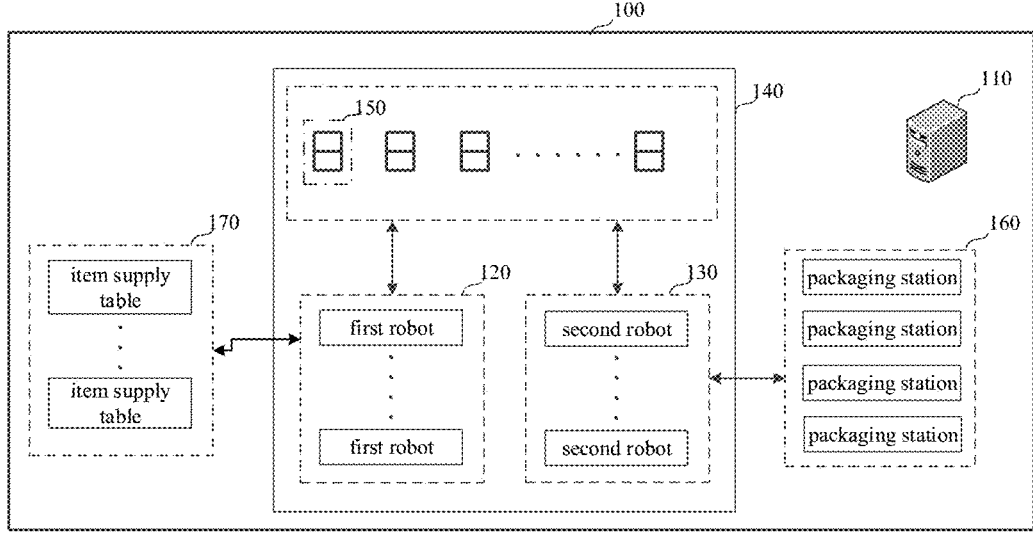
FIG. 3 is a diagram illustrating a structure of another item sorting system provided in embodiments of the present disclosure.

In embodiments of the present disclosure, as illustrated in FIG. 3, the item sorting system 100 further includes: a plurality of item supply tables 170.

The plurality of item supply tables 170 are further configured to provide an item to be sorted; and the control server 110 is further configured to determine a target sub-compartment from the at least two sub-compartments of the at least one item-collecting container 150 based on an item destination and item attribute information of the item to be sorted.

In the embodiment, a first preset threshold may be configured based on a volume of the first sub-compartment, which will not be limited here. The item destination refers to a delivery address of an item; and the item attribute information refers to at least one of a category, a size and a color of an item. It may be understood that, in embodiments of the present disclosure, the item destination and/or the item attribute information includes an item destination; or includes item attribute information; or includes an item destination and item attribute information, which is not specifically limited herein.

At least two compartments of the at least one item-collecting container 150 deployed in the storage area 140 of the item sorting system 100 may have uniquely identified coordinates, numbers, QR codes, etc. The compartment may be a virtual device.

In the embodiment, the first robot 120 may be a sorting robot, the second robot may be a handling robot, and a number of first robots and a number of second robots may be one or more, respectively. It should be noted that, in an item sorting process, at least one sorting robot in the embodiment may automatically screen an item supply table that is closest to the at least one sorting robot and has a queuing number less than a number threshold when a working state of the at least one sorting robot is idle, and queue in a queuing area of the item supply table. When any sorting robot travels to a pickup point of the item supply table, the item supply table may automatically place the item to be sorted on an item placing table of the sorting robot through a mechanical arm. In embodiments of the present disclosure, when the item to be sorted is placed on the item placing table of the sorting robot, the item to be sorted on the item supply table may be further placed on the item placing table of the sorting robot by an operator, which is not limited here.

In an embodiment, the control server 110 is communicatively connected to the first robot 120, the second robot 130, and other hardware devices or software systems in the item sorting system 100 in a wireless manner, to send a scheduling task to the first robot 120, the second robot 130, and the other hardware devices or software systems in the item sorting system 100, detect a working state of the item sorting system 100, and count an item storage condition of each item-collecting container in the storage area 140 of the item sorting system 100. In the embodiment, there may be at least one control server 110.

In an implementation, the control servers 110 may determine a target sub-compartment matching item information from the at least one item-collecting container in the storage area 140 of the item sorting system 100 based on the item destination and the item attribute information of the item to be sorted; the item information includes an item destination and item attribute information. When it is determined that the target sub-compartment is a first sub-compartment in a first item-collecting container, a sorting instruction may be sent to a first robot, so that the first robot may deliver the item to be sorted to the first sub-compartment based on the sorting instruction. Meanwhile, the control server 110 further detects items accommodated in each sub-compartment of each item-collecting container in the storage area 140, and determines whether the items accommodated in the sub-compartment reach a preset threshold. The control server 110 sends a transport instruction to a second robot when the items accommodated in the first sub-compartment reach a first preset threshold, so that the second robot transports the first item-collecting container to a packaging station specified by the transport instruction, thereby completing one item sorting operation. Since the item sorting system 100 may include a plurality of packaging stations 160, when the second robot transports the first item-collecting container to the packaging stations 160, the packaging stations 160 are preferentially packaging stations in an idle state. When all packaging stations are in the working state, the packaging stations 160 are preferentially packaging stations with the least packaging task amount.

When the control server 110 determines a target sub-compartment based on the item destination and the item attribute information of the item to be sorted, the item destination and the item attribute information of the item to be sorted may be determined first, and a target sub-compartment may be determined based on the item destination and the item attribute information of the item to be sorted. For example, determining the item destination and the item attribute information of the item to be sorted may include the following situations.

First Situation

The item destination and the item attribute information of the item to be sorted are determined based on an acquired item information table.

Specifically, the item information table may be acquired from a provider side of the item to be sorted, so that the control server analyzes the item information table, and determines the item destination and the item attribute information of the item to be sorted.

Second Situation

The item information of the item to be sorted sent by the item supply table is received, the item information includes an item destination and/or item attribute information.

Specifically, an upper-layer device may send the item destination and/or the item attribute information of the item to be sorted to the item supply table, in which case, the item supply table may forward the item destination and/or the item attribute information of the item to be sorted sent by the upper-layer device to the control server, so that the control server determines the item destination and/or the item attribute information of the item to be sorted based on information forwarded by the item supply table.

Further, a target sub-compartment matching the item destination and/or the item attribute information is determined from the at least one item-collecting container in the storage area 140 of the item sorting system 100 based on the determined item destination and/or item attribute information of the item to be sorted.

In the embodiment, when it is determined that the target sub-compartment is a first sub-compartment of the first item-collecting container and the sorting instruction is sent to schedule the first robot to deliver the item to the first sub-compartment, the control server 110 may further count a number of items accommodated in the first sub-compartment, and compare the number of items with a first preset threshold, to determine whether the first sub-compartment is filled. When the number of items accommodated in the first sub-compartment reaches the first preset threshold, it is determined that the first sub-compartment is filled. When the number of items accommodated in the first sub-compartment does not reach the first preset threshold, it is determined that the first sub-compartment is not filled.

As an optional implementation, in the embodiment, the control server 110 may be further implemented in other various manners in addition to determining whether the first sub-compartment is filled based on the number of items accommodated in the first sub-compartment, for example, the following manners.

First Manner

The control server 110 counts a volume of the items accommodated in the first compartment, and compare a counted item volume with a volume threshold. When the item volume reaches the volume threshold, it is determined that the first sub-compartment is filled. The volume threshold may be adaptively set based on a volume of the first sub-compartment, which will not be limited here.

Second Manner

The control server 110 determines whether a depth of the items accommodated in the first sub-compartment reaches a depth threshold by receiving depth information sent by a depth sensor. When the item depth reaches the depth threshold, it is determined that the first sub-compartment is filled. The depth threshold may be adaptively set based on a capacity size of the first sub-compartment, which is not specifically limited here.

In embodiments of the present disclosure, the implementation of determining whether the first sub-compartment is filled is not limited to the above several manners, and may also be achieved in other manners, which is not specifically limited here.

It should be noted that, in the embodiment, the control server 110 may further count a number of items accommodated in at least two sub-compartments in other item-collecting containers, and determine whether each sub-compartment in the other item-collecting containers is filled based on a comparison result of the number of items of each sub-compartment and the first preset threshold.

In the embodiment, when there are a plurality of second robots, the control server 110 may select a target second robot from the plurality of second robots in response to determining that the items accommodated in the first sub-compartment reach a first preset threshold, and send a transport instruction to a target second robot, so that the target second robot travels to a position of the first item-collecting container, and transports the first item-collecting container to a packaging station specified by the transport instruction in response to the transport instruction sent by the control server 110.

In an optional implementation, when the control server 110 selects the target second robot from the plurality of second robots, it may be implemented in different manners, and in an embodiment, for example, a second robot that does not perform a transport task is taken as the target second robot; or, a second robot that does not perform a transport task and is close to the first item-collecting container is taken as the target second robot, etc. In this way, a second robot close to the first item-collecting container and in an idle state, or the second robot in the idle state is preferentially selected, which may avoid affecting normal operation of the second robot that performs the transport task, and fully utilize resources of the handling robot, thereby improving a transport speed.

An item sorting system is provided in embodiments of the present disclosure. In embodiments of the present disclosure, at least one item-collecting container including at least two sub-compartments are deployed in a storage area of an item sorting system, so that the control server determines a target sub-compartment from the at least one item-collecting container, and sends a sorting instruction to a first robot, so that the first robot delivers an item to a target sub-compartment; and when the target sub-compartment is a first sub-compartment of a first item-collecting container and items accommodated in the first sub-compartment reach a first preset threshold, the control server sends a transport instruction to a second robot, so that the second robot transports the first item-collecting container to the packaging station for packaging processing. In at least one solution provided in the present application, a plurality of item-collecting containers with a plurality of sub-compartments are deployed in the storage area of the item sorting system, which makes it unnecessary to build a steel platform for sorting items, so as to effectively save a cost and avoid a low item sorting efficiency caused due to a limitation of a number of auxiliary equipments on the steel platform, and a number of compartments in the storage area in the item sorting system may be increased, and which makes a configuration of a number of compartments more flexible and convenient. Meanwhile, a first robot having a sorting function and a second robot having a transport function cooperate with each other for item sorting, which may fully exert their corresponding function advantages, and achieve advantage complementation between robots with different functions, thereby improving an item sorting speed and efficiency.

Figure 4:
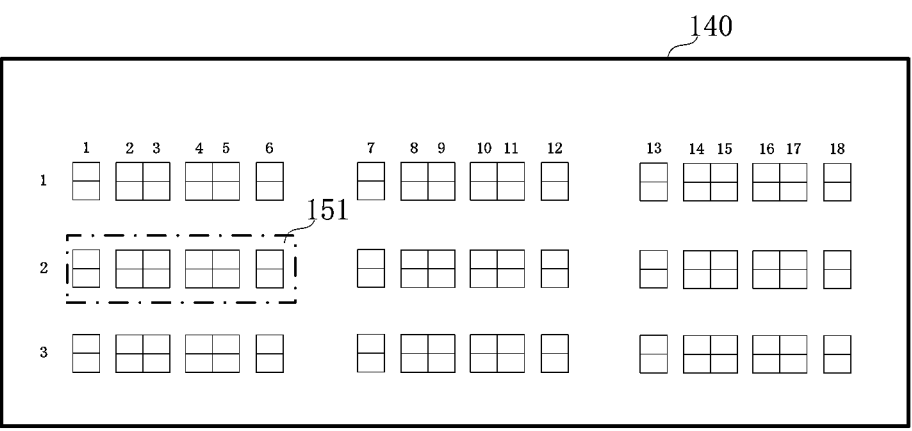
FIG. 4 is a diagram illustrating a plurality of item-collecting containers deployed in a storage area of an item sorting system provided in embodiments of the present disclosure.

In an optional implementation of the embodiment, the implementation may be combined with each optional solution in the one or more embodiments. As illustrated in FIG. 4, there are a plurality of item-collecting containers 150 deployed in the storage area 140 of the item sorting system 100, and the plurality of item-collecting containers 150 are deployed in an arrangement of M rows*N columns; where M and N are positive integers. For example, refer to an arrangement of 3 rows*18 columns in FIG. 4. In order to facilitate management of a plurality of item-collecting containers, M rows*N columns may be divided into a plurality of groups 151, for example, 18 groups. Each group 151 may include at least two item-collecting containers, specifically as illustrated in FIG. 4. In this way, a plurality of item-collecting containers including at least two sub-compartments are deployed in the storage area of the item sorting system, which may effectively increase a number of compartments in the storage area, and provides a condition for improving an item sorting efficiency.

In embodiments of the present disclosure, as illustrated in FIG. 3 and FIG. 4, the control server 110 is further configured to determine a degree of association between each item destination and/or each item attribute information and other item destinations and/or other item attribute information based on acquired item destinations and/or item attribute information; and select a highest degree of association from a plurality of degrees of association obtained, and allocate at least two item destinations and/or item attribute information corresponding to the highest degree of association to different sub-compartments of a same item-collecting container. Further, the control server 110 may obtain a mapping relationship between item information (including an item destination and item attribute information) and a sub-compartment of the item-collecting container. In this way, the item destinations and/or item attribute information that are close may be allocated to different sub-compartments of the same item-collecting container, which may ensure that a difference between the time for which a plurality of sub-compartments of each item-collecting container are filled is within a small range, and the plurality of sub-compartments of the each item-collecting container are basically filled at the same time, thereby improving an item sorting efficiency.

It should be noted that, in embodiments of the present disclosure, in addition to determining the degree of association based on the item destinations and/or the item attribute information, a degree of association between an order, a route or a store of each item and orders, routes or stores of other items may be determined based on the orders, the routes or the stores of the item, and a highest degree of association may be selected from a plurality of degrees of association, and information such as orders, routes and stores of two items corresponding to the highest degree of association are allocated to different sub-compartments of the same item-collecting container, etc.

In the embodiment, as illustrated in FIGS. 3 and 4, the control server 110 is further configured to determine a target sub-compartment from the at least two sub-compartments of the at least one item-collecting container based on a mapping relationship between the item information (including an item destination and/or item attribute information) and the sub-compartment of the item-collecting container. In an implementation, the control server 110 may query whether there is an item destination and/or item attribute information in the mapping relationship based on the item destination and/or the item attribute information of the item. If so, the sub-compartment having the mapping relationship with the item destination and/or the item attribute information is determined as the target sub-compartment, and the item-collecting container to which the target sub-compartment belongs is determined as the target item-collecting container. For example, when the item destination is the Yanta District of Xi'an, query whether there is a destination of the Yanta District of Xi'an in the mapping relationship, when there is the destination of the Yanta District of Xi'an in the mapping relationship, it is determined that a sub-compartment 1 # having the mapping relationship with the Yanta District of Xi'an is the target sub-compartment, and an item-collecting container 13 to which the sub-compartment 1 # belongs is the target item-collecting container.

Figure 5:
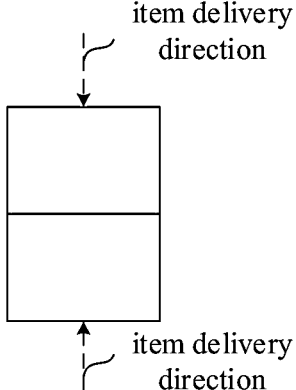
FIG. 5 is a top view illustrating an item delivery direction of at least two sub-compartments of an item-collecting container provided in embodiments of the present disclosure.

In the implementation, at least two compartments on each item-collecting container 150 deployed in the storage area 140 of the item sorting system 100 are respectively configured with item delivery directions. For example, FIG. 5 is a top view illustrating item delivery directions of at least two sub-compartments of an item-collecting container provided in embodiments of the present disclosure. Based on FIG. 5, in embodiments of the present disclosure, the first robot 120 is further configured to deliver an item to the first sub-compartment based on the item delivery direction in response to the sorting instruction. The item delivery direction of the first sub-compartment is carried in the sorting instruction. Therefore, the first robot may correctly delivery the item to the first sub-compartment from the item delivery direction based on the item delivery direction carried in the sorting instruction, to reduce an error in item delivery of the first robot.

Figure 6:
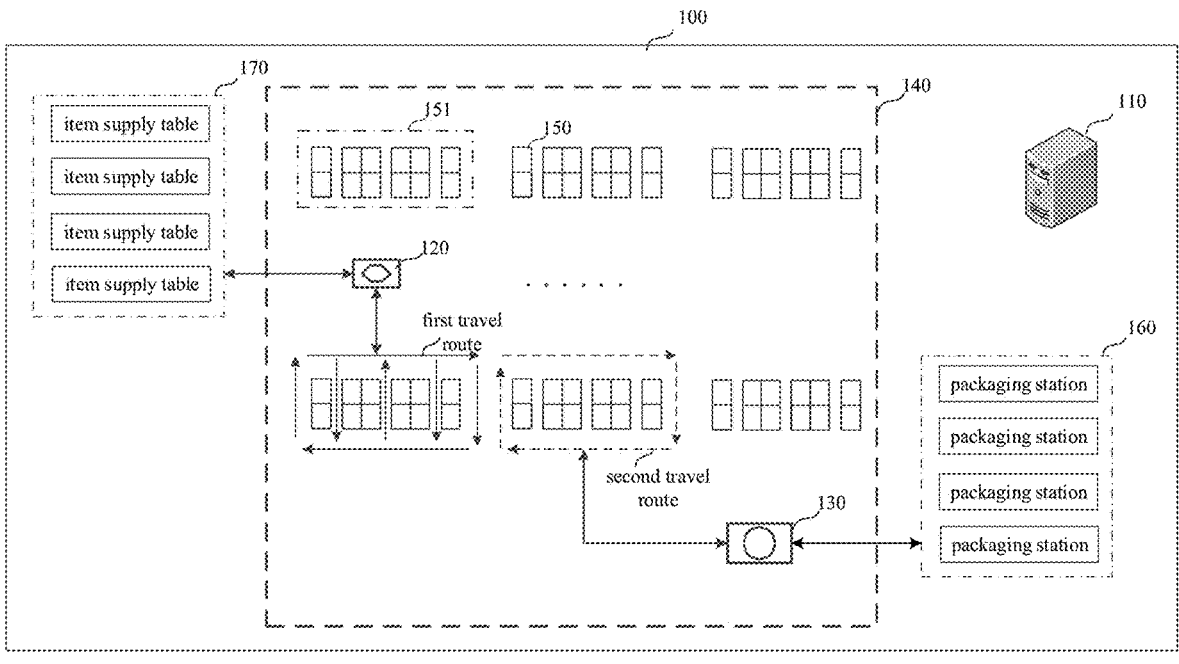
FIG. 6 is a diagram illustrating scheduling a first robot and a second robot provided in embodiments of the present disclosure.

In an optional implementation of the embodiment, the implementation may be combined with each optional solution in the one or more embodiments. As illustrated in FIG. 6, in the item sorting system 100 provided in embodiments of the present disclosure, travel routes used by the first robot 120 and the second robot 130 are respectively configured in the storage area 140.

The travel route of the first robot 120 is a first travel route, and the travel route of the second robot 130 is a second travel route. The first travel route is disposed between adjacent item-collecting containers in each group of item-collecting containers and around an outer edge area of the group of item-collecting containers. Specifically, as illustrated in FIG. 6, the first robot 120 travels according to the first travel route. The second travel route is disposed in an outer edge area of each group of compartments. Specifically, as illustrated in FIG. 6, dashed lines are a travel diagram of the second robot 130 according to the second travel route.

The first robot 120 is configured to deliver an item to the first sub-compartment according to the first travel route in response to the sorting instruction sent by the control server 110.

The second robot 130 is configured to, in response to the transport instruction sent by the control server 110, travel to the position of the first item-collecting container according to the second travel route, and transport the first item-collecting container to the packaging station 160 specified by the transport instruction. Different travel routes are respectively set for the first robot 120 and the second robot 130, which may avoid a conflict or a congestion due to the number of first robots and second robots being multiple when the robots perform an item sorting task.

Figure 7:
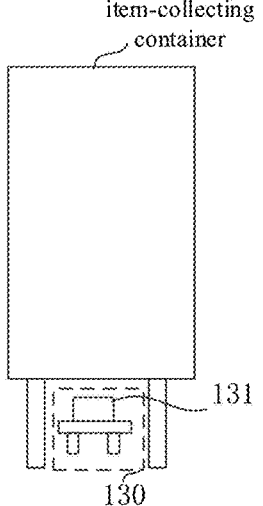
FIG. 7 is a front view illustrating a second robot with a lifting mechanism transporting an item-collecting container provided in embodiments of the present disclosure.

In an optional example, as illustrated in FIG. 7, the second robot 130 is configured with a lifting mechanism 131;

the second robot 130 is further configured to, in response to the transport instruction sent by the control server 110, travel to the bottom of the first item-collecting container according to the second travel route, lift the first item-collecting container by using a lifting mechanism 131, and transport the first item-collecting container to a packaging station specified by the transport instruction. FIG. 7 is a front view illustrating a second robot with a lifting mechanism transporting an item-collecting container provided in embodiments of the present disclosure. As illustrated in FIG. 7, an accommodating height between a lower surface at the bottom of the item-collecting container and a surface of the storage area 140 is greater than a transport height when the second robot 130 transports the item-collecting container, to ensure that the second robot 130 may smoothly travel to a position below the item-collecting container, thereby preventing the second robot 130 from being stuck below the item-collecting container when transporting the item-collecting container.

In an optional implementation of the embodiment, the implementation may be combined with each optional solution in the one or more embodiments. As illustrated in FIG. 6, in embodiments of the present disclosure, the control server 110 is further configured to: determine whether a current transport policy is a direct transport policy when the items accommodated in the first sub-compartment reach the first preset threshold; if so, send the transport instruction to the second robot; if not, determine whether items accommodated in the other sub-compartment of the first item-collecting container reach a second preset threshold; and send the transport instruction to the second robot in response to the items accommodated in the other sub-compartment of the first item-collecting container reaching the second preset threshold.

A transport policy may be configured according to the actual requirement. For example, the transport policy may include: a first policy, direct transport; a second policy, a transport operation is performed when an item loading completion degree of the other sub-compartment in the item-collecting container reaches a preset threshold; and a third policy, a waiting time is set for other sub-compartment of a same item-collecting container, and a handling operation is performed when reaching the waiting time, etc., which is not specifically limited here.

In the embodiment, a second preset threshold may be configured based on a volume of each sub-compartment, which will not be limited here. For example, the second preset threshold is configured to be 80% or 85%, which will not be limited here.

In an embodiment, the control server 110 determines whether the current transport policy is direct transport by querying configuration information. The control server 110 sends a transport instruction to the second robot or selects a target second robot from the plurality of second robots 130 and sends a transport instruction to the target second robot in response to determining that the current transport policy is direct transport based on the configuration information. The control server 110 further determines whether items accommodated in the other sub-compartment of the first item-collecting container reach a second preset threshold in response to determining that the current transport policy being not direct transport based on the configuration information. The control server 110 sends a transport instruction to the second robot or selects a target second robot from the plurality of second robots 130 and sends a transport instruction to the target second robot, in response to determining that the items accommodated in the other sub-compartment of the first item-collecting container reach the second preset threshold.

Determining by the control server 110 whether the items accommodated in the other sub-compartment of the first item-collecting container reach the second preset threshold specifically includes: calculating an item loading completion degree in each other sub-compartment based on the number, the volume or the depth of items accommodated in the other sub-compartment of the first item-collecting container. Then, the item loading completion degree of each other sub-compartment is compared with the second preset threshold, and when the item loading completion degree of any other sub-compartment reaches the second preset threshold, it is determined that the items accommodated in the other sub-compartment reach the second preset threshold, otherwise the items accommodated in the other sub-compartment do not reach the second preset threshold.

In the embodiment, the control server 110 is further configured to, determine whether the first sub-compartment is configured with the waiting time in response to the items accommodated in the other sub-compartment of the first item-collecting container not reaching the second preset threshold; respectively determine a sub-compartment with a same item destination and/or same item attribute information of the first sub-compartment and a sub-compartment with a same item destination and/or same item attribute information of the other sub-compartment of the first item-collecting container from the other item-collecting containers in the storage area in response to the first sub-compartment being configured with the waiting time; and when the item destination and/or the item attribute information of a second sub-compartment in a second item-collecting container is same as that of the first sub-compartment, control the first robot to preferentially deliver an item belonging to the first sub-compartment to the second sub-compartment in the second item-collecting container; and when the item destination and/or the item attribute information of a remaining sub-compartment in the second item-collecting container is same as that of the other sub-compartment of the first item-collecting container, control the first robot to preferentially deliver an item belonging to the remaining sub-compartment in the second item-collecting container to the other sub-compartment of the first item-collecting container.

A waiting time may be configured based on actual requirements. For example, the waiting time may be configured to be 3 min or 5 min, but not limited to the above numeric value.

Specifically, the control server 110 may determine whether the first sub-compartment is configured with the waiting time by querying configuration information. When it is determined that the first sub-compartment is configured with the waiting time, the sub-compartment with the same item destination and/or item attribute information of the first sub-compartment and the sub-compartment with the same item destination and/or item attribute information of the other sub-compartment of the first item-collecting container are determined, so that the item belonging to the first sub-compartment may continue being delivered while the first sub-compartment waits for the other sub-compartment of the first item-collecting container, thereby avoiding the situation that the item may not continue being delivered to the first sub-compartment when the first sub-compartment is filled. Meanwhile, by determining the sub-compartment with the same item destination and/or item attribute information as the other sub-compartment of the first item-collecting container, the first robot may be controlled to preferentially deliver the item, that can be delivered to the sub-compartment with the same item destination and/or item attribute information of the other sub-compartment of the first item-collecting container, to the other sub-compartment of the first item-collecting container, so that the other sub-compartment of the first item-collecting container may be filled in a short time, thereby reducing the waiting time of the first sub-compartment.

For example, if the item destination corresponding to the other sub-compartment of the first item-collecting container is "Enjili Community, Haidian District, Beijing", the control server 110 may send a scheduling instruction to the first robot when analyzing that the item destination corresponding to a sub-compartment 2 # on a 34th item-collecting container in the storage area 140 is "Enjili Community, Haidian District, Beijing", so that the first robot preferentially delivers the item delivered to the sub-compartment 2 # on the 34th item-collecting container to the other sub-compartments of the first item-collecting container.

In the implementation, the control server 110 is further configured to: determine whether the item delivery time of the other sub-compartment of the first item-collecting container reaches the waiting time; if so, send a transport instruction to the second robot; if not, control the first robot to continue preferentially delivering the item belonging to the remaining sub-compartment in the second item-collecting container to the other sub-compartment of the first item-collecting container until the waiting time is reached, and send the transport instruction to the second robot.

In an embodiment, when the first robot is controlled to preferentially deliver the item belonging to the first sub-compartment to the second sub-compartment in the second item-collecting container; and the first robot is controlled to preferentially deliver the item in the remaining sub-compartment in the second item-collecting container to the other sub-compartment of the first item-collecting container, the control server 110 may further count a time length from a moment at which the first sub-compartment is filled to a current moment, and compare the time length with the waiting time. When the time length is greater than or equal to the waiting time, it is determined that an item delivery time of the other sub-compartment of the first item-collecting container reaches the waiting time, otherwise the item delivery time of the other sub-compartment of the first item-collecting container does not reach the waiting time.

When it is determined that the item delivery time of the other sub-compartment of the first item-collecting container reaches the waiting time, it indicates that the waiting time of the first sub-compartment reaches a maximum value, a transport operation needs to be performed, in this case, the control server 110 may send a transport instruction to the second robot or select a target second robot from a plurality of second robots 130, and send a transport instruction to the target second robot, so that the second robot travels to the position of the first item-collecting container and transports the first item-collecting container to the packaging station 160 specified by the transport instruction in response to the transport instruction sent by the control server 110. When it is determined that the item delivery time of the other sub-compartment of the first item-collecting container does not reach the waiting time, it indicates that the first sub-compartment may continue waiting, in this case, the control server 110 may continue controlling the first robot to preferentially deliver the item, that can be delivered to the sub-compartment with the same item destination and/or item attribute information of the other sub-compartment of the first item-collecting container, to the other sub-compartment of the first item-collecting container, until the waiting time is reached. In the embodiment, a plurality of different transport policies are set, which may increase the diversity of an item sorting process, satisfy the handling requirements in different conditions, and improve the user experience.

In an optional implementation of the embodiment, the implementation may be combined with each optional solution in the one or more embodiments. As illustrated in FIG. 6, in an item sorting system in embodiments of the present disclosure, there are a plurality of second robots; the control server 110 is further configured to select a new second robot in addition to the second robot transporting the first item-collecting container from the plurality of second robots, and send a scheduling instruction to the new second robot; and the new second robot is configured to, in response to the scheduling instruction, place a third item-collecting container with at least two sub-compartments to the position where the first item-collecting container is located before being transported.

Specifically, when the second robot is controlled to transport the first item-collecting container to the packaging station, the control server 110 may allocate a new item-collecting container (a third item-collecting container) to the position where the first item-collecting container is located before being transported, so that the storage area 14 always has an item-collecting container that can be used, thereby improving an item sorting effect.

In embodiments of the present disclosure, the control server 110 is further configured to respectively update a mapping relationship between the at least two sub-compartments of each item-collecting container deployed in the storage area and item information; the item information includes an item destination and/or item attribute information.

When the second robot transports the first item-collecting container from the position of the first item-collecting container to the packaging station, the control server 110 may reallocate a new item-collecting container to the position, and an item destination and/or item attribute information corresponding to each sub-compartment of the new item-collecting container may vary, in this case, the control server 110 may update each sub-compartment on each item-collecting container in the storage area of the item-collecting system 100 and the mapping relationship between the item destination and/or the item attribute information, so that an item sorting compartment may be accurately located in subsequent item sorting. In the embodiment, each sub-compartment on at least one item-collecting container deployed in the storage area 140 of the item sorting system 100 may correspond to at least one item destination and/or item attribute information, and each of the at least one item destination and/or item attribute information may correspond to at least one sub-compartment. It should be noted that, when the mapping relationship is updated, a mapping relationship between a compartment and a store, an item order and a route may be further updated in addition to the mapping relationship between the compartment and the item destination and/or the item attribute information, which will not be limited here.

Figure 8:
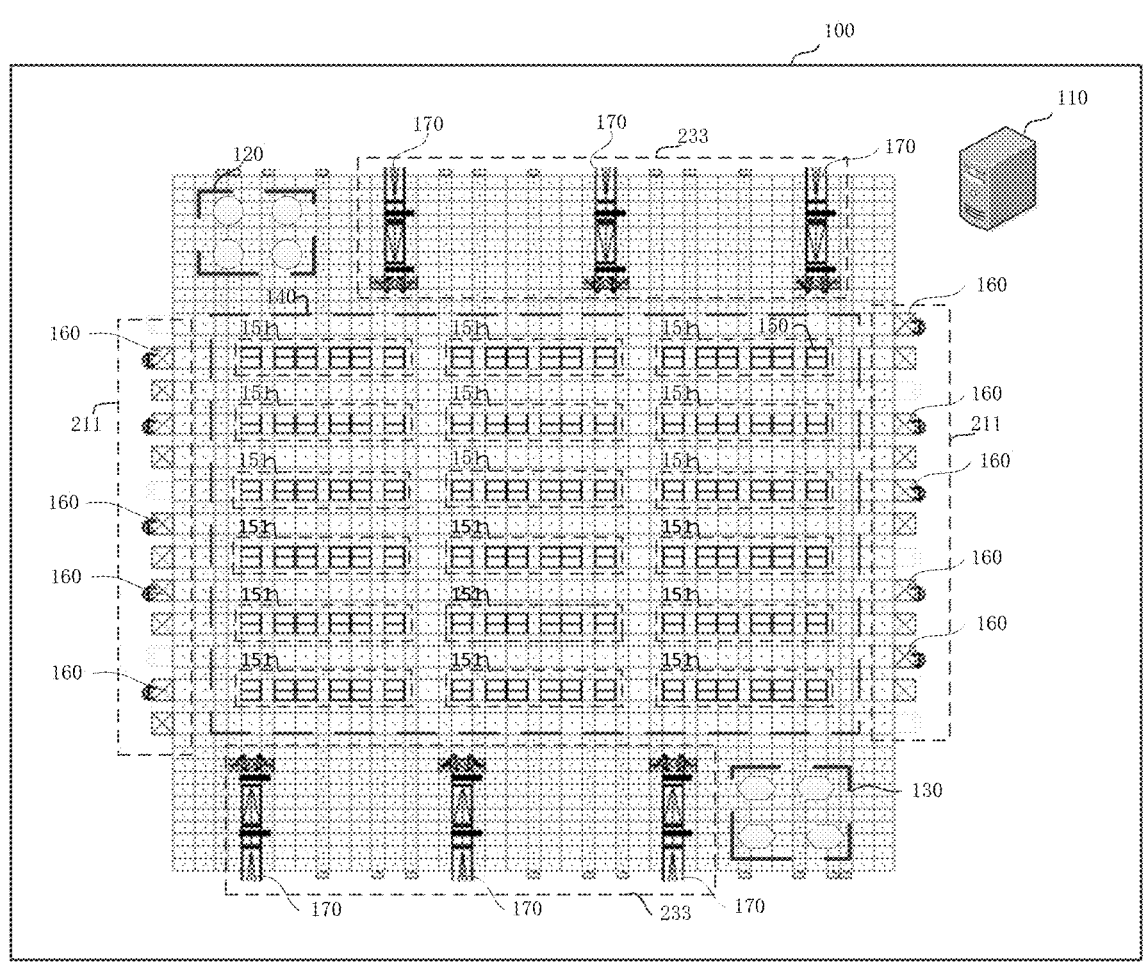
FIG. 8 is a diagram illustrating a deployment of an item sorting system provided in embodiments of the present disclosure.

In order to describe the embodiments of the present disclosure more clearly, the item sorting system in embodiments of the present disclosure are described in combination with the FIG. 8. For example, the item sorting system 100 includes a control server 110, a plurality of first robots 120, a plurality of second robots 130, at least one item-collecting container 150, a plurality of packaging stations 160 and a plurality of item supply tables 170. The first robot 120, the second robot 130, the plurality of packaging stations 160, and the plurality of item supply tables 170 respectively communicate with the control server 110. The plurality of first robots 120 and the plurality of second robots 130 respectively run in the storage area 140 of the item sorting system 100. At least one container 150 is deployed in the storage area 140, and each item-collecting container includes at least two sub-compartments. As illustrated in FIG. 8, the plurality of packaging stations 160 may be located in a first area 211 of the item sorting system 100, the at least one item-collecting container 150 is located in the storage area 140 of the item sorting system 100, and the plurality of item supply tables 170 are located in a third area 233 of the item sorting system 100. In embodiments of the present disclosure, the first area 211, the storage area 140, and the third area 233 are distributed on a same plane on the ground of the item sorting system 100, and the first area 211, the storage area 140, and the third area 233 do not overlap. For example, as illustrated in FIG. 8, the first area 211 is distributed in an upper edge area and a lower edge area of the same plane, the storage area 140 is distributed in a central area of the same plane, and the third area 233 is distributed in a left edge area and a right edge area of the same plane. In FIG. 8, the following is illustrated by taking at least one item-collecting container being divided into a plurality of groups according to a 6*3 format and a number of the plurality of item supply tables being 6 for an example, and may be specifically set according to actual requirements, which is not limited here.

The first robot and the second robot may travel in the storage area 140 of the item sorting system 100 according to the item sorting requirement, to achieve item sorting. That is, the ground having the item supply tables, the packaging stations, the item-collecting containers with at least two sub-compartments, the first robots and the second robots is an item sorting site. Therefore, based on the item sorting requirement, the item sorting site may be flexibly adjusted and expanded, without needing to build a steel platform, which saves the cost of building the steel platform.

Figure 9:
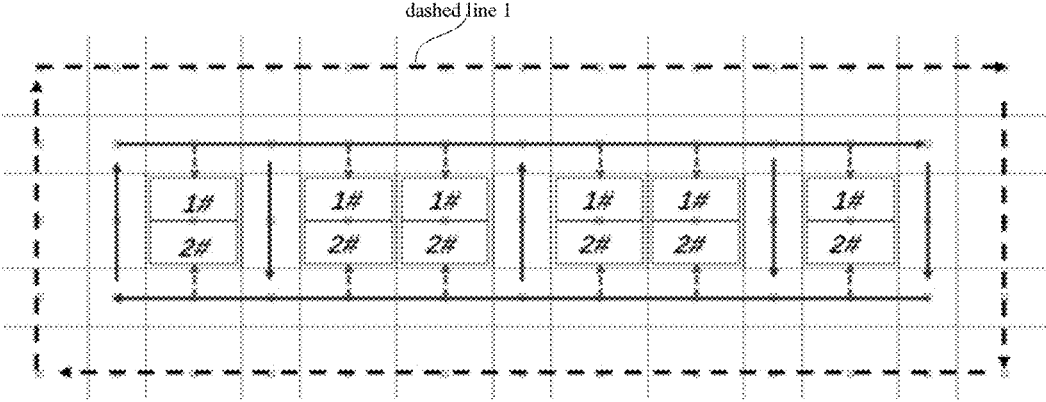
FIG. 9 is a diagram illustrating travel routes respectively configured for a first robot and a second robot in a single group of item-collecting containers provided in embodiments of the present disclosure.

Since there are a plurality of the first robot and the second robot, a congestion may occur when an item sorting task is performed, and in embodiments of the present disclosure, different travel routes may be further respectively configured for the first robot and the second robot in the storage area, to reduce the congestion. The following is illustrated by taking one of a plurality of groups of item-collecting containers in a storage area for an example. For example, as illustrated in FIG. 9, a single group of item-collecting containers may include a plurality of item-collecting containers, and each item-collecting container includes at least two sub-compartments. In addition to that shown in FIG. 9, the number of sub-compartments included in each item-collecting container and the arrangement of the item-collecting containers in each group may be set according to actual requirements, which are not specifically limited here. In the single group of item-collecting containers, since the volume of the first robot (a sorting robot) is smaller than that of the second robot (a handling robot), and the flexibility of the first robot is better than that of the handling robot, the first robot may usually run between the adjacent item-collecting containers and around an outer edge area of the group of item-collecting containers, so that a first travel route for the first robot to travel may be provided between the adjacent item-collecting containers and in the outer area of each group of item-collecting containers. For example, a solid line in FIG. 9 is the first travel route of the first robot. For the second robot, in order to reduce a travel conflict with the first robot, a second travel route for the second robot to travel may be only provided in the outer edge area of each group of compartments. For example, a dashed line 1 in FIG. 9 is the second travel route of the second robot. It should be noted that, travel modes of the first robot and the second robot in the storage area deployed with a plurality of groups of item-collecting containers, are similar to that in a single group of item-collecting containers, which are not repeated here.

That is, in embodiments of the present disclosure, the item-collecting container with the plurality of sub-compartments is arranged on the ground without building a steel platform, thereby saving the cost, and further providing a condition for increasing the number of compartments by dividing the item-collecting container into more sub-compartments. In addition, travel routes are respectively set for the first robot and the second robot, so that a congestion occurring when robots walk may be reduced, thereby improving an item sorting speed and efficiency.

FIG. 10 is a flowchart illustrating an item sorting method in embodiments of the present disclosure. The embodiments of the present disclosure are applicable to a scenario of item sorting. The method is applied to an item sorting system provided in any embodiments of the present disclosure.

As illustrated in FIG. 10, the item sorting method provided in embodiments of the present disclosure may include the following steps.

At S101, a control server determines a target sub-compartment from at least two sub-compartments of at least one item-collecting container, and sends a sorting instruction to a first robot; and the control server sends a transport instruction to a second robot when the target sub-compartment is a first sub-compartment of a first item-collecting container and items accommodated in the first sub-compartment reach a first preset threshold; the first robot and the second robot respectively communicate with the control server, and respectively run in a storage area of the item sorting system; and the storage area is deployed with at least one item-collecting container, each of at least one item-collecting container includes at least two sub-compartments.

At S102, the first robot is configured to deliver an item to the first sub-compartment in response to the sorting instruction.

At S103, the second robot is configured to, in response to the transport instruction, travel to a position of the first item-collecting container, and transport the first item-collecting container to a packaging station specified by the transport instruction.

On the basis of the above embodiment, in an embodiment, before the control server sends the transport instruction to the second robot, the method further includes:

the control server determines whether a current transport policy is a direct transport policy;

correspondingly, sending by the control server the transport instruction to the second robot includes:

the control server sends the transport instruction to the second robot in response to the current transport policy being a direct transport policy.

On the basis of the above embodiment, in an embodiment, before the control server determines whether a current transport policy is a direct transport policy, the method further includes:

the control server determines whether items accommodated in the other sub-compartment of the first item-collecting container reach a second preset threshold in response to the current transport policy being not a direct transport policy; and the control server sends the transport instruction to the second robot in response to the items accommodated in the other sub-compartment of the first item-collecting container reaching the second preset threshold.

On the basis of the above embodiment, in an embodiment, after the control server determines whether items accommodated in the other sub-compartment of the first item-collecting container reach a second preset threshold, the method further includes:

the control server determines whether the first sub-compartment is configured with a waiting time in response to the items accommodated in the other sub-compartment of the first item-collecting container not reaching the second preset threshold;

the control server respectively determines a sub-compartment with a same item destination and/or same item attribute information of the first sub-compartment and a sub-compartment with a same item destination and/or same item attribute information of the other sub-compartment of the first item-collecting container from other item-collecting containers in the storage area in response to the first sub-compartment being configured with the waiting time; and when the item destination and/or the item attribute information of a second sub-compartment in a second item-collecting container is same as that of the first sub-compartment, the control server controls the first robot to preferentially deliver an item belonging to the first sub-compartment to the second sub-compartment in the second item-collecting container; and when the item destination and/or the item attribute information of a remaining sub-compartment in the second item-collecting container is same as that of the other sub-compartment of the first item-collecting container, the control server controls the first robot to preferentially deliver an item belonging to the remaining sub-compartment in the second item-collecting container to the other sub-compartment of the first item-collecting container.

On the basis of the above embodiment, in an embodiment, after the control server determines whether the first sub-compartment is configured with the waiting time, the method further includes:

the control server sends the transport instruction to the second robot in response to the first sub-compartment being not configured with the waiting time.

On the basis of the above embodiment, in an embodiment, after the control server controls the first robot to preferentially deliver the item belonging to the remaining sub-compartment in the second item-collecting container to the other sub-compartment of the first item-collecting container, the method further includes:

the control server determines whether an item delivery time of the other sub-compartment of the first item-collecting container reaches the waiting time; and the control server sends the transport instruction to the second robot in response to the item delivery time of the other sub-compartment of the first item-collecting container reaching the waiting time.

On the basis of the above embodiment, in an embodiment, after the control server determines whether an item delivery time of the other sub-compartment of the first item-collecting container reaches the waiting time, the method further includes:

in response to the item delivery time of the other sub-compartment of the first item-collecting container not reaching the waiting time, the control server controls the first robot to continue preferentially delivering the item in the remaining sub-compartment in the second item-collecting container to the other sub-compartment of the first item-collecting container until the waiting time is reached, and sends the transport instruction to the second robot.

On the basis of the above embodiment, in an embodiment, transporting by the control server the first item-collecting container to a packaging station specified by the transport instruction includes:

in response to the transport instruction, the second robot travels to the bottom of the first item-collecting container, lifts the first item-collecting container by using the lifting mechanism, and transports the first item-collecting container to the packaging station specified by the transport instruction.

On the basis of the above embodiment, in an embodiment, after the control server sends the transport instruction to the second robot, the method further includes:

the control server selects a new second robot in addition to the second robot transporting the first item-collecting container from a plurality of second robots, and sends a scheduling instruction to the new second robot; and the new second robot, in response to the scheduling instruction, places a third item-collecting container with at least two sub-compartments to a position where the first item-collecting container is located before being transported.

On the basis of the above embodiment, in an embodiment, after the control server transports the first item-collecting container to a packaging station specified by the transport instruction, the method further includes:

the control server is further configured to respectively update a mapping relationship between the at least two sub-compartments of each item-collecting container deployed in the storage area and item information; the item information includes an item destination and/or item attribute information.

On the basis of the above embodiment, before the control server determines the target sub-compartment from the at least two sub-compartments of least amino item-collecting container, the method further includes:

the control server determines a degree of association between each item destination and/or each item attribute information, and other item destinations and/or other item attribute information based on acquired item destinations and/or item attribute information; and the control server selects a highest degree of association from a plurality of degrees of association obtained, and allocates at least two item destinations and/or item attribute information corresponding to the highest degree of association to different sub-compartments of a same item-collecting container.

On the basis of the above embodiment, in an embodiment, at least two sub-compartments of each item-collecting container are respectively provided with item delivery directions;

correspondingly, delivering by the first robot the item to the first sub-compartment in response to the sorting instruction includes:

the first robot delivers the item to the first sub-compartment based on the item delivery direction in response to the sorting instruction.

On the basis of the above embodiment, in an embodiment, there are a plurality of item-collecting containers, and the plurality of item-collecting containers are deployed in the storage area in an arrangement of M rows*N columns; where M and N are positive integers.

On the basis of the above embodiment, the first robot runs in the storage area according to a first travel route; and the second robot runs in the storage area according to a second travel route.

The item sorting method provided in embodiments of the present disclosure is applicable to an item sorting system provided in any embodiments of the present disclosure, and has a corresponding function and a beneficial effect of the item sorting system. Technical details described in the above embodiments may refer to an item sorting system provided in any embodiments of the present disclosure.

In descriptions of the specification, descriptions with reference to terms "one embodiment", "some embodiments", "example", "specific examples" or "some examples" etc. mean specific features, structures, materials or characteristics described in conjunction with the embodiment or example are included in at least one embodiment or example of the present disclosure. In this specification, the schematic representations of the above terms do not have to be a same embodiment or example. Moreover, specific features, structures, materials or characteristics described may be combined in any one or more embodiments or examples in a suitable manner.

It is noted that the foregoing is merely a preferred embodiment of the present application and the applied technical principle. Those skilled in the art may understand that the present application is not limited to specific embodiments described herein, and various obvious changes, readjustments and substitutions may be made without departing from the protection scope of the present application. Therefore, although the present application is described in the above embodiments, the present application is not limited to the above embodiments, and more other equivalent embodiments may be included without departing from the concept of the present application, and the scope of the present application is determined by the scope of the appended claims.

What is claimed is:

1. An item sorting system, comprising: a control server, a first robot and a second robot; wherein the first robot and the second robot respectively communicate with the control server, and respectively run in a storage area of the item sorting system; and the storage area is deployed with at least one item-collecting container, each of the at least one item-collecting container comprises at least two sub-compartments; wherein:

the control server is configured to determine a target sub-compartment from the at least two sub-compartments of the at least one item-collecting container, and send a sorting instruction to the first robot; and send a transport instruction to the second robot when the target sub-compartment is a first sub-compartment of a first item-collecting container and items accommodated in the first sub-compartment reach a first preset threshold;

the first robot is configured to deliver an item to the first sub-compartment in response to the sorting instruction;

the second robot is configured to, in response to the transport instruction, travel to a position of the first item-collecting container and transport the first item-collecting container to a packaging station specified by the transport instruction, and the control server is further configured to respectively determine, in response to items accommodated in one or more other sub-compartments of the first item-collecting container not reaching a second preset threshold and the first sub-compartment being configured with a waiting time, a sub-compartment with a same item destination and/or same item attribute information of the first sub-compartment and a sub-compartment with a same item destination and/or same item attribute information of the one or more other sub-compartments of the first item-collecting container from other item-collecting containers in the storage area; and when the item destination and/or the item attribute information of a second sub-compartment in a second item-collecting container is same as that of the first sub-compartment, control the first robot to preferentially deliver an item belonging to the first sub-compartment to the second sub-compartment in the second item-collecting container; and when the item destination and/or the item attribute information of one or more remaining sub-compartments in the second item-collecting container is same as that of the one or more other sub-compartments of the first item-collecting container, control the first robot to preferentially deliver an item belonging to the one or more remaining sub-compartments in the second item-collecting container to the one or more other sub-compartments of the first item-collecting container.

2. The system according to claim 1, wherein the control server is further configured to determine whether items accommodated in a sub-compartment reach a preset threshold;

wherein the control server is further configured to determine whether a current transport policy is a direct transport policy when the items accommodated in the first sub-compartment reach the first preset threshold; and send the transport instruction to the second robot in response to determining that the current transport policy is the direct transport policy.

3. The system according to claim 2, wherein:

the control server is further configured to determine whether items accommodated in one or more other sub-compartments of the first item-collecting container reach a second preset threshold in response to a current handling policy being not a direct handling policy; and send the transport instruction to the second robot in response to the items accommodated in the one or more other sub-compartments of the first item-collecting container reaching the second preset threshold.

4. The system according to claim 2, wherein the items accommodated in the sub-compartment reaching the preset threshold indicates that: at least one of an item number, an item volume or an item depth corresponding to the items accommodated in the sub-compartment reaches the preset threshold.

5. The system according to claim 1, wherein the control server is further configured to send the transport instruction to the second robot in response to the first sub-compartment being not configured with the waiting time.

6. The system according to claim 1, wherein the control server is further configured to determine whether an item delivery time of the one or more other sub-compartments of the first item-collecting container reaches the waiting time; and send the transport instruction to the second robot in response to the item delivery time of the one or more other sub-compartments of the first item-collecting container reaching the waiting time.

7. The system according to claim 6, wherein the control server is further configured to, in response to the item delivery time of the one or more other sub-compartments of the first item-collecting container not reaching the waiting time, control the first robot to continue preferentially delivering the item in the one or more remaining sub-compartments in the second item-collecting container to the one or more other sub-compartments of the first item-collecting container until the waiting time is reached or it is determined that the items accommodated in the one or more other sub-compartments of the first item-collecting container reach the second preset threshold, and send the transport instruction to the second robot.

8. The system according to claim 1, wherein the second robot is configured with a lifting mechanism; and the second robot is further configured to, in response to the transport instruction, travel to the bottom of the first item-collecting container, lift the first item-collecting container by the lifting mechanism, and transport the first item-collecting container to the packaging station specified by the transport instruction.

9. The system according to claim 1, wherein there are a plurality of second robots;

the control server is further configured to select a new second robot in addition to the second robot transporting the first item-collecting container from the plurality of second robots, and send a scheduling instruction to the new second robot; and the new second robot is configured to, in response to the scheduling instruction, place a third item-collecting container with at least two sub-compartments to the position where the first item-collecting container is located before being transported.

10. The system according to claim 9, wherein the control server is further configured to respectively update a mapping relationship between the at least two sub-compartments of each item-collecting container deployed in the storage area and item information; wherein the item information comprises an item destination and/or item attribute information.

11. The system according to claim 1, wherein the control server is further configured to determine a degree of association between each item destination and/or each item attribute information and other item destinations and/or other item attribute information, based on acquired item destinations and/or item attribute information; and select a highest degree of association from a plurality of degrees of association obtained, and allocate at least two item destinations and/or item attribute information corresponding to the highest degree of association to different sub-compartments of a same item-collecting container.

12. The system according to claim 1, wherein the at least two sub-compartments of each item-collecting container are respectively provided with item delivery directions; and the first robot is further configured to deliver the item to the first sub-compartment based on the item delivery direction corresponding to the first sub-compartment in response to the sorting instruction.

13. The system according to claim 1, wherein there are a plurality of item-collecting containers, and the plurality of item-collecting containers are deployed in the storage area in an arrangement of M rows*N columns; where M and N are positive integers, and the first robot runs in the storage area according to a first travel route; and the second robot runs in the storage area according to a second travel route.

14. An item sorting method, applied in an item sorting system comprising a control server, a first robot and a second robot, wherein the first robot and the second robot respectively communicate with the control server and respectively run in a storage area of the item sorting system; the storage area is deployed with at least one item-collecting container, and each of the at least one item-collecting container comprises at least two sub-compartments, wherein the method comprises:

determining by the control server a target sub-compartment from the at least two sub-compartments of the at least one item-collecting container, and sending by the control server a sorting instruction to the first robot; and sending by the control server a transport instruction to the second robot when the target sub-compartment is a first sub-compartment of a first item-collecting container and items accommodated in the first sub-compartment reach a first preset threshold;

delivering by the first robot an item to the first sub-compartment in response to the sorting instruction; and travelling by the second robot to a position of the first item-collecting container, and transporting by the second robot the first item-collecting container to a packaging station specified by the transport instruction in response to the transport instruction, wherein the method further comprises:

respectively determining by the control server, in response to items accommodated in one or more other sub-compartments of the first item-collecting container not reaching a second preset threshold and the first sub-compartment being configured with a waiting time, a sub-compartment with a same item destination and/or same item attribute information of the first sub-compartment and a sub-compartment with a same item destination and/or same item attribute information of the one or more other sub-compartments of the first item-collecting container from other item-collecting containers in the storage area; and when the item destination and/or the item attribute information of a second sub-compartment in a second item-collecting container is same as that of the first sub-compartment, controlling by the control server the first robot to preferentially deliver an item belonging to the first sub-compartment to the second sub-compartment in the second item-collecting container; and when the item destination and/or the item attribute information of one or more remaining sub-compartments in the second item-collecting container is same as that of the one or more other sub-compartments of the first item-collecting container, controlling by the control server the first robot to preferentially deliver an item belonging to the one or more remaining sub-compartments in the second item-collecting container to the one or more other sub-compartments of the first item-collecting container.

15. The method according to claim 14, wherein, before sending by the control server the transport instruction to the second robot, the method further comprises:

determining by the control server whether a current transport policy is a direct transport policy;

wherein sending by the control server the transport instruction to the second robot comprises:

sending by the control server the transport instruction to the second robot in response to determining that the current transport policy is the direct transport policy.

16. The method according to claim 15, wherein, after determining by the control server whether the current transport policy is the direct transport policy, the method further comprises:

determining by the control server whether items accommodated in one or more other sub-compartments of the first item-collecting container reach a second preset threshold in response to the current transport policy being not the direct transport policy; and sending by the control server the transport instruction to the second robot in response to the items accommodated in the one or more other sub-compartments of the first item-collecting container reaching the second preset threshold.

17. The method according to claim 14, wherein sending the transport instruction to the second robot further comprises:

in response to the current transport policy being not the direct transport policy, sending by the control server the transport instruction to the second robot when determining that the first sub-compartment is not configured with the waiting time.

18. A non-transitory computer readable storage medium, configured in a control server of an item sorting system, wherein the item sorting system further comprises a first robot and a second robot, the first robot and the second robot respectively communicate with the control server and respectively run in a storage area of the item sorting system; the storage area is deployed with at least one item-collecting container, and each of the at least one item-collecting container comprises at least two sub-compartments, when instructions in the storage medium are executed by a processor of the control server, the processor is configured to:

determine a target sub-compartment from the at least two sub-compartments of the at least one item-collecting container, and send a sorting instruction to the first robot; and send a transport instruction to the second robot when the target sub-compartment is a first sub-compartment of a first item-collecting container and items accommodated in the first sub-compartment reach a first preset threshold, deliver an item to the first sub-compartment in response to the sorting instruction; and travel to a position of the first item-collecting container, and transport the first item-collecting container to a packaging station specified by the transport instruction in response to the transport instruction, wherein the processor is further configured to:

respectively determine, in response to items accommodated in one or more other sub-compartments of the first item-collecting container not reaching a second preset threshold and the first sub-compartment being configured with a waiting time, a sub-compartment with a same item destination and/or same item attribute information of the first sub-compartment and a sub-compartment with a same item destination and/or same item attribute information of the one or more other sub-compartments of the first item-collecting container from other item-collecting containers in the storage area; and when the item destination and/or the item attribute information of a second sub-compartment in a second item-collecting container is same as that of the first sub-compartment, control the first robot to preferentially deliver an item belonging to the first sub-compartment to the second sub-compartment in the second item-collecting container; and when the item destination and/or the item attribute information of one or more remaining sub-compartments in the second item-collecting container is same as that of the one or more other sub-compartments of the first item-collecting container, control the first robot to preferentially deliver an item belonging to the one or more remaining sub-compartments in the second item-collecting container to the one or more other sub-compartments of the first item-collecting container.

* * * * *